United States Patent
Tsai

(10) Patent No.: US 10,486,828 B2
(45) Date of Patent: Nov. 26, 2019

(54) UNMANNED AERIAL VEHICLE

(71) Applicant: Chiun Mai Communications Systems, Inc., New Taipei (TW)

(72) Inventor: Mong-Hau Tsai, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 423 days.

(21) Appl. No.: 15/386,448

(22) Filed: Dec. 21, 2016

(65) Prior Publication Data

US 2017/0313441 A1    Nov. 2, 2017

(30) Foreign Application Priority Data

Apr. 28, 2016    (CN) .......................... 2016 1 0271718

(51) Int. Cl.
*B64D 47/08*    (2006.01)
*B64C 39/02*    (2006.01)

(52) U.S. Cl.
CPC ............ *B64D 47/08* (2013.01); *B64C 39/024* (2013.01); *B64C 2201/027* (2013.01); *B64C 2201/108* (2013.01); *B64C 2201/127* (2013.01); *B64C 2201/162* (2013.01)

(58) Field of Classification Search
CPC ........ B64C 2201/127; B64C 2201/027; B64C 2201/162; B64C 2201/108
See application file for complete search history.

(56) References Cited

U.S. PATENT DOCUMENTS

| | | | | |
|---|---|---|---|---|
| 5,152,478 A | * | 10/1992 | Cycon | B64C 27/10 244/12.2 |
| 5,277,380 A | * | 1/1994 | Cycon | B64C 27/20 244/12.2 |
| 5,351,913 A | * | 10/1994 | Cycon | B64C 27/20 244/12.2 |
| 5,419,513 A | * | 5/1995 | Flemming, Jr. | B64C 27/20 244/12.2 |
| 6,270,038 B1 | * | 8/2001 | Cycon | B64C 27/20 244/12.2 |
| 2016/0286128 A1 | * | 9/2016 | Zhou | H04N 5/23248 |
| 2017/0152060 A1 | * | 6/2017 | Morisawa | B64C 27/08 |
| 2017/0253325 A1 | * | 9/2017 | Zou | B64C 27/006 |

FOREIGN PATENT DOCUMENTS

CN    204846389 U    12/2015
WO    2015178091 A1    11/2015

* cited by examiner

*Primary Examiner* — Philip J Bonzell
*Assistant Examiner* — Tye William Abell
(74) *Attorney, Agent, or Firm* — ScienBiziP, P.C.

(57) ABSTRACT

An unmanned aerial vehicle includes a housing, at least one driving module, and at least one driving module. The housing includes an outer structure made of shock-absorbing material, and an inner structure made of rigid material, the inner structure partially embedded into the outer structure. The at least one driving module is assembled to the housing. The at least one detecting module is fixed on the inner structure and surrounded by the outer structure.

15 Claims, 5 Drawing Sheets

UNMANNED AERIAL VEHICLE

FIELD

The disclosure generally relates to unmanned aerial vehicles (UAVs), and particularly to a UAV having a collision protection function.

BACKGROUND

A UAV commonly has a detecting module such as a camera configured for detecting and avoiding obstacles during flight. However, if the UAV collides with the obstacles, the detecting module mounted on the UAV may be shifted or even damaged due to the collision, which may negatively impact the UAV's obstacle avoidance capability.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
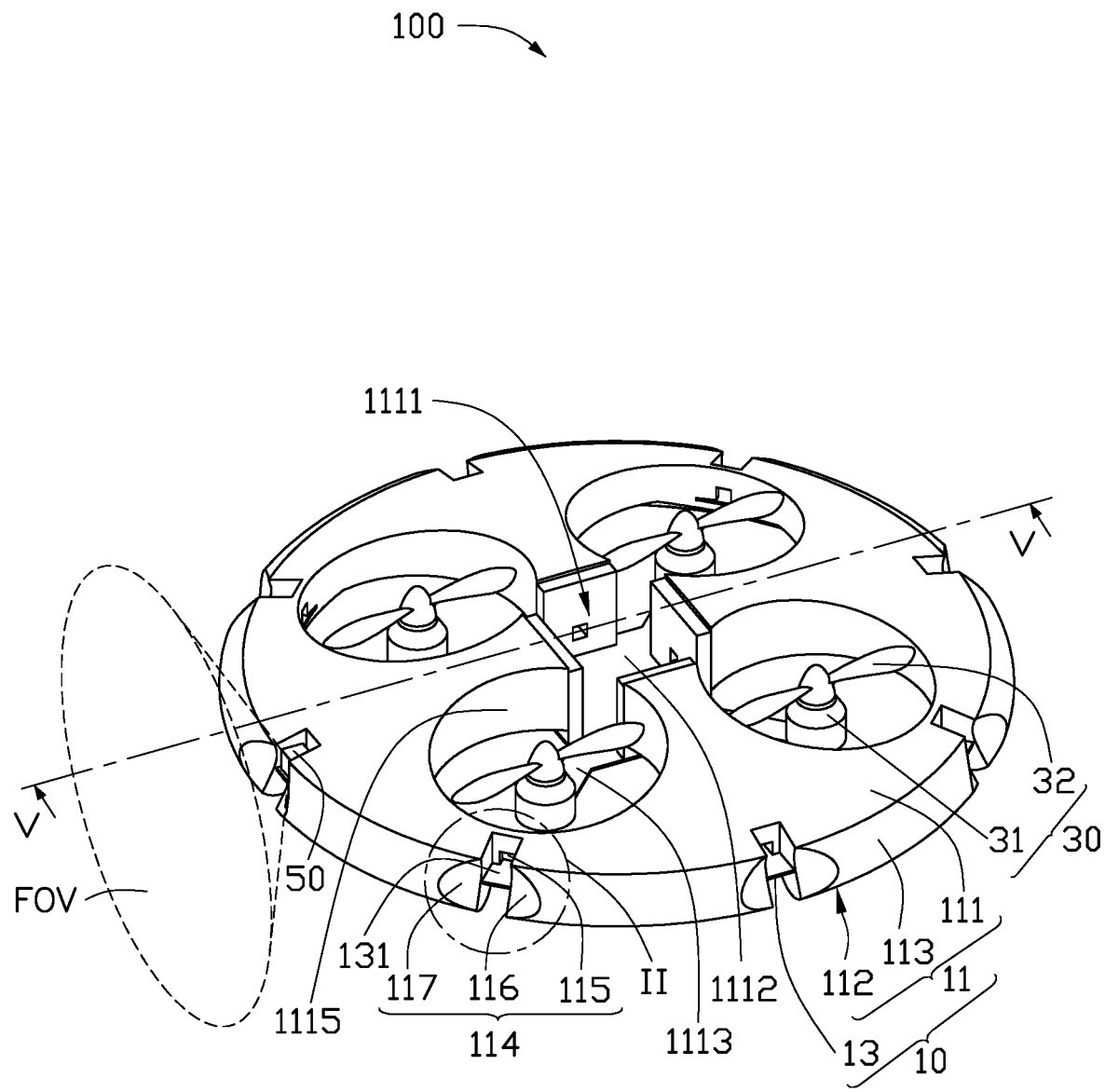
FIG. 1 is an isometric view of one exemplary embodiment of a UAV.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 shows an isometric view of one exemplary embodiment of an unmanned aerial vehicle (UAV) 100. The unmanned aerial vehicle 100 includes a housing 10, at least one driving module 30 assembled to the housing 10, and at least one detecting module 50. The driving module 30 is configured for driving the unmanned aerial vehicle 100 to fly. The least one detecting module 50 is configured to detect obstacles that the unmanned aerial vehicle 100 may met during flight so that the unmanned aerial vehicle 100 can timely avoid the obstacles.

Figure 2:
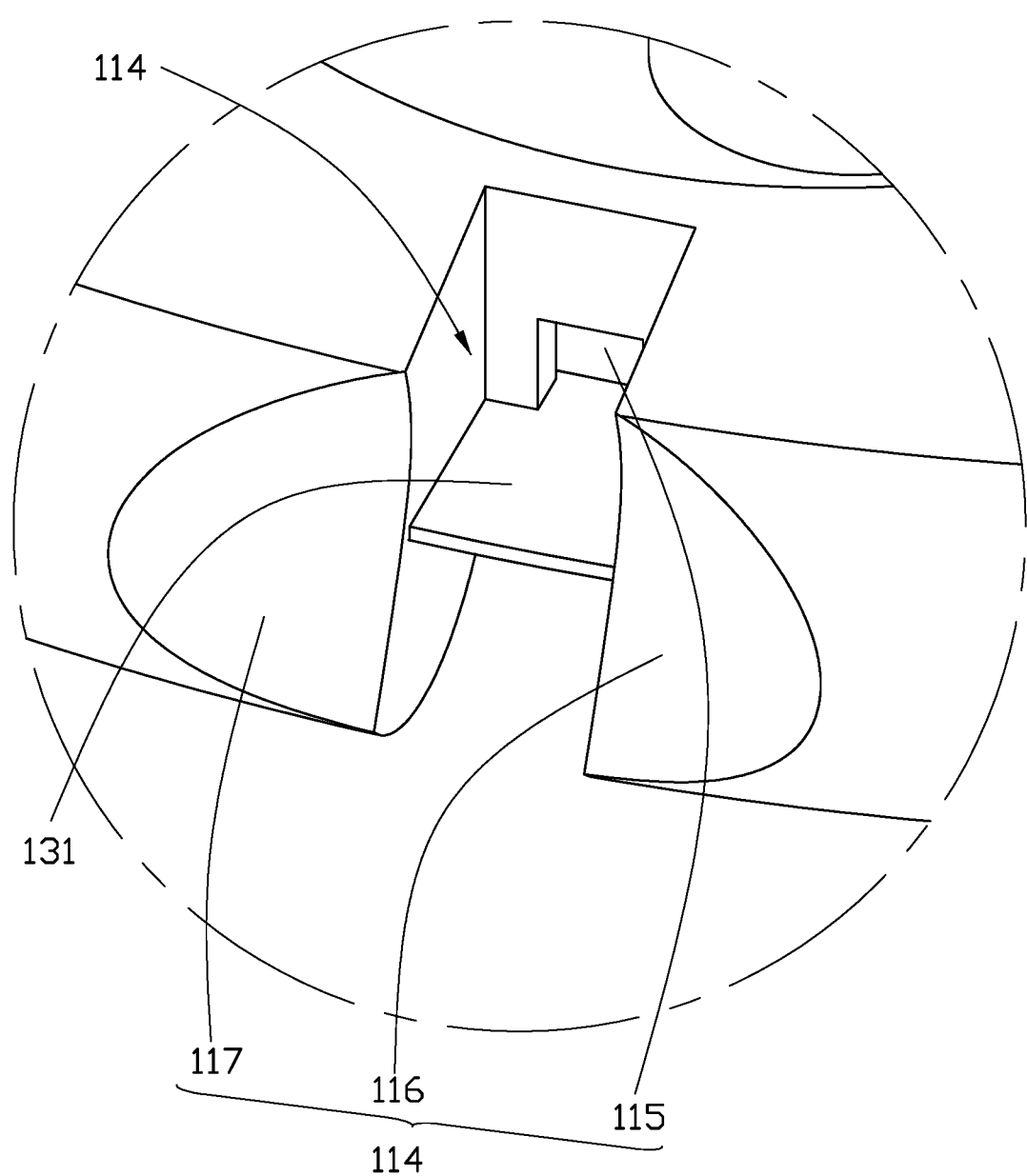
FIG. 2 is a partially, enlarged view of the UAV of FIG. 1.
Figure 3:
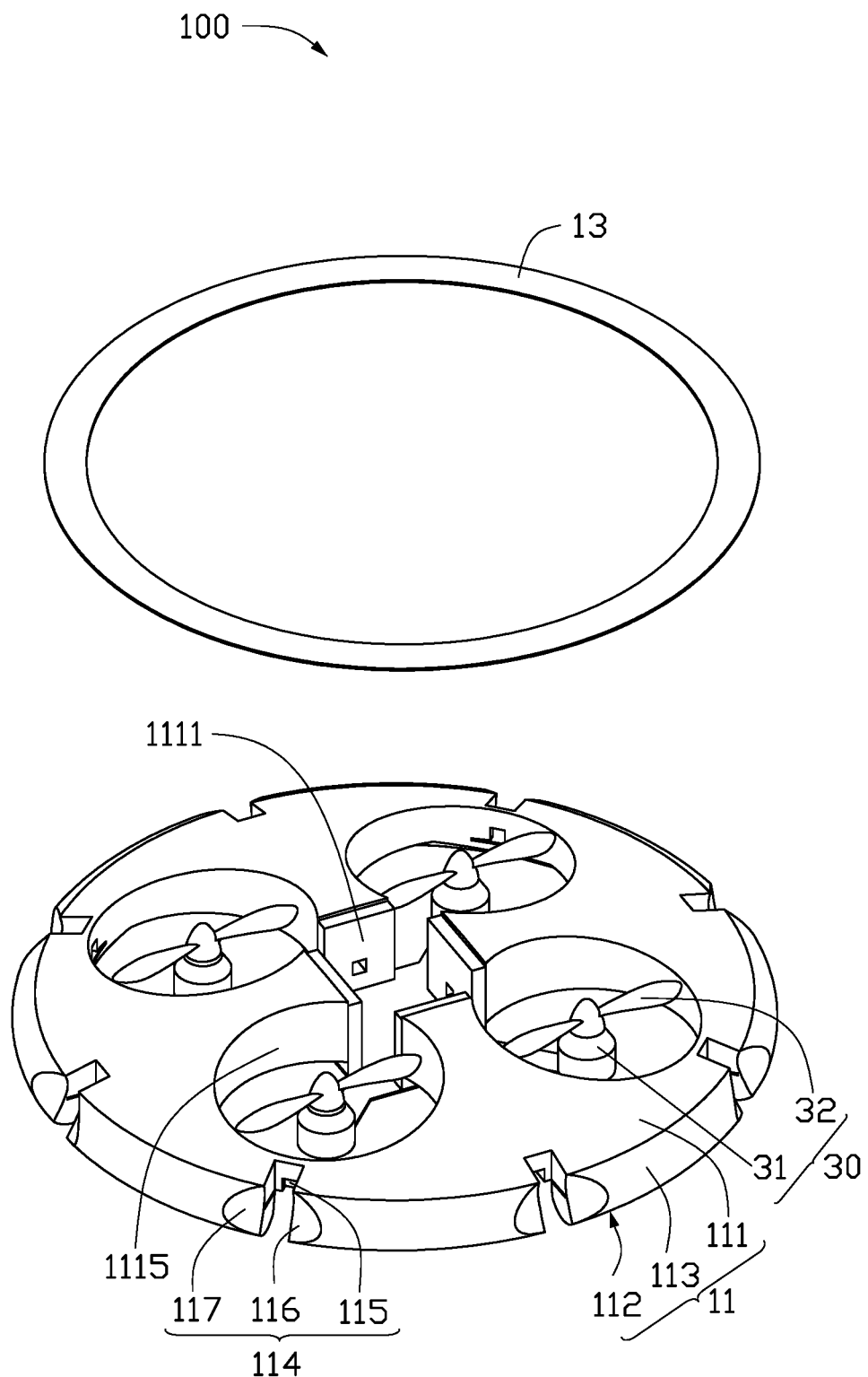
FIG. 3 is a partially, disassembled view of the UAV of FIG. 1.

FIGS. 2 and 3 illustrates that the housing 10 includes an outer structure 11 and an inner structure 13 partially embedded into the outer structure 11. An elastic coefficient of the outer structure 11 is greater than an elastic coefficient of the inner structure 13. In this exemplary embodiment, the outer structure 11 is made of shock-absorbing material or elastic material, such as EPO material. The inner structure 13 is made of rigid material, such as carbon fiber, iron, steel or other suitable metal materials. The least one detecting module 50 is fixed to the inner structure 13. The outer structure 11 surrounds an outer perimeter of the detecting module 50 to protect the detecting module 50. Meanwhile, the inner structure 13 made of rigid material provides a relative stable structure so that the inner structure 13 can prevent the detecting module 50 fixed on the inner structure 13 from shaking or shifting during flight, which may negatively impact the detection accuracy of the detecting module 50.

In this embodiment, the outer structure 11 is in a substantially circular shape, and includes a first surface 111, a second surface 112 opposite to the first surface 111, and a peripheral surface 113 connecting the first surface 111 and the second surface 112. In other exemplary embodiments, the shape of the outer structure 11 can be, but not limited to, a cube, a sphere, etc.

A receiving portion 1111 is defined in a substantially central position of the first surface 111. The receiving portion 1111 is configured for receiving a circuit module used to control the unmanned aerial vehicle 100 to fly. The receiving portion 1111 is formed by the first surface 111 recessed toward the second surface 112. The receiving portion 1111 includes a bottom wall 1112. The bottom wall 1112 is a substantially square plate. Each corner of the bottom wall 1112 is extended along a diagonal direction away from the center of the bottom wall 1112 to form an arm 1113. The arms 1113 are configured to support and assemble the driving modules 30. The number of the arms 1113 may be equal to the number of the driving modules 30 of the unmanned aerial vehicle 100. In this exemplary embodiment, there are four arms 1113.

A plurality of receiving holes 1115 are positioned in the outer structure 11. The number of the receiving holes 1115 may be equal to the number of the arms 1113. In this exemplary embodiment, there are four receiving holes 1115. The receiving holes 1115 are defined in an inner peripheral edge of the receiving portion 1111 and are evenly spaced. Each receiving hole 1115 communicates with the first surface 111 and the second surface 112. The arms 1113 and the driving modules 30 are received in the corresponding receiving holes 1115.

At least one receiving chamber 114 is positioned in the peripheral surface 113 and configured to receive the detecting module 50. The number of the receiving chambers 114 may be equal to the number of the detecting modules 50. In this exemplary embodiment, there are eight receiving chambers 114 and eight detecting modules 50. The receiving chambers 114 are formed on and evenly distributed along the peripheral surface 113. Each receiving chamber 114 includes a receiving slot 115 positioned between the first surface 111 to the second surface 112, and a cut 116 defined in the peripheral surface 113. The receiving slot 115 runs through the first surface 111 and the second surface 112. The cut 116 is formed between two sides of the receiving slot 115. Two arc surfaces 117 are formed in the peripheral surface 113 by each cut 116. A cone can be formed by the two arc surfaces 117 extending along a direction toward the corresponding receiving slot 115.

In this exemplary embodiment, the inner structures 13 are each a ring-shaped sheet. The inner structures 13 are each partially embedded in the outer structure 11, and partially exposed from the corresponding receiving slots 115 to form a plurality of mounting portions 131 corresponding to the detecting modules 50.

Figure 4:
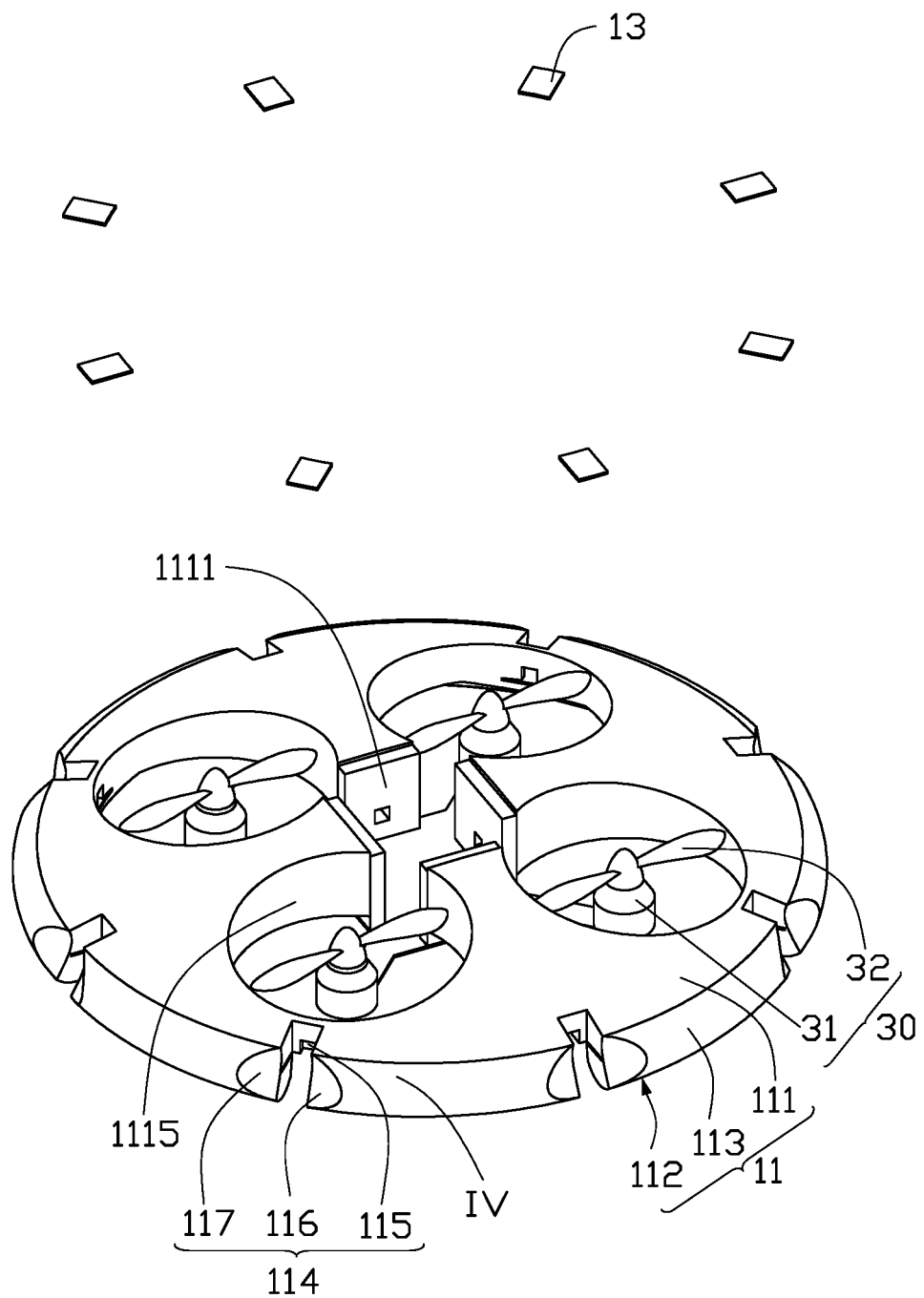
FIG. 4 a partially, disassembled view of a UAV, according to another embodiment.
Figure 5:
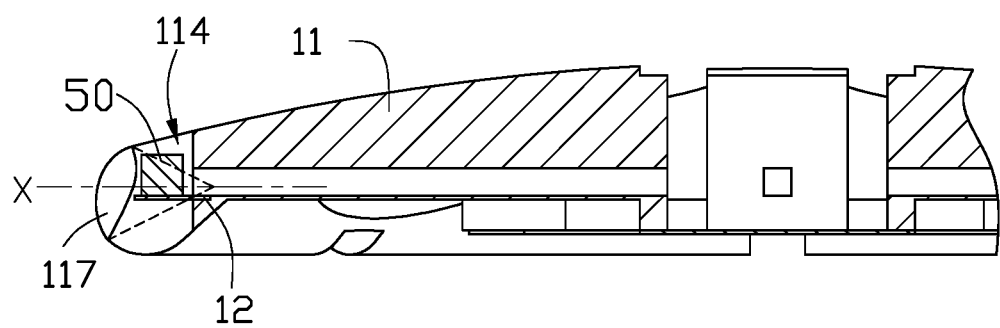
FIG. 5 is a partial cross-sectional view of the UAV of FIG. 1 along line V.

In other exemplary embodiments, the inner structures 13 can be a plurality of sheets as shown in FIG. 4. The number of the inner structures 13 may be equal to the number of the receiving slots 115. Each sheet is partially embedded in the corresponding outer structure 11 and partially exposed from the corresponding receiving slot 115 to form one of the mounting portions 131.

Each driving module 30 includes a motor 31 mounted at an end of the corresponding arm 1113 and a rotor 32 assembled to the motor 31. Each driving module 30 is received in the corresponding receiving hole 1115, positioned at the center of the receiving hole 1115, and surrounded by the outer structure 11. Thus, the outer structure 11 can protect the driving module 30 from impact.

Each detecting module 50 is fixed to the corresponding mounting portion 131. The outer surface of each detecting module 50 is surrounded by the corresponding outer structure 11. Each detecting module 50 is spaced from the corresponding outer structure 11. In other words, the detecting modules 50 have no direct contact with the outer structure 11. Thus, the outer structure 11 can further protect the detecting modules 50.

In this exemplary embodiment, the detecting modules 50 are camera modules. Each camera module includes a focus point and a field of view (FOV). The focus point of each camera module is positioned on a central axis of the cone. A width of the cone at the peripheral wall 113 is greater than or equate to a width of the FOV of the camera module. That is, the arc surfaces 117 is positioned outside the FOV of each camera module. Therefore, the outer structure 11 can protect the camera modules without blocking the FOVs of the camera modules.

In other exemplary embodiments, the FOV of each camera module may be overlapped with the peripheral wall 113, so that each camera module can obtain a viewable angle of 360 degrees.

In other embodiments, the detecting modules 50 can be ultrasonic detection modules or infrared detection modules.

The outer structure 11 of the UAV 100 made of shock-absorbing material can protect the detecting modules 50 surrounded by the outer structure 11. Meanwhile, the inner structure 13 made of rigid material provides a relative stable structure so that the inner structure 13 can prevent the detecting module 50 fixed on the inner structure 13 from shaking or shifting during flight, which may negatively impact the detection accuracy of the detecting module 50.

It is to be understood, however, that even through numerous characteristics and advantages of the present disclosure have been set fourth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An unmanned aerial vehicle (UAV) comprising:
   a housing, the housing comprising:
      an outer structure;
      an inner structure, the inner structure embedded in the outer structure;
   at least one driving module assembled to the housing; and
   at least one detecting module fixed on the inner structure and surrounded by the outer structure;
   wherein the outer structure comprises a peripheral wall, the peripheral wall comprises at least one receiving chamber, the at least one receiving chamber comprises a receiving slot in the outer structure, the inner structure is partially exposed from the receiving slot to form at least one mounting portion corresponding to the at least one detecting module, the at least one detecting module is fixed to the at least one mounting portion;
   wherein the at least one receiving chamber further comprises two cuts in the peripheral wall, the two cuts are positioned at sides of the receiving slot;
   wherein the peripheral wall comprises two arc surfaces by the two cuts, the arc surfaces extend along a direction toward the receiving slot to form a cone.

2. The UAV of claim 1, wherein the at least one detecting module is an ultrasonic detection module or an infrared detection module.

3. The UAV of claim 1, wherein the inner structure is a ring-shaped plate, the ring-shaped plate is embedded into the outer structure and partially exposed from the receiving slot to form the at least one mounting portion.

4. The UAV of claim 1, wherein the inner structure comprises a plurality of arc-shaped plates, each of the plurality of arc-shaped plates is embedded into the outer structure and partially exposed from the receiving slot to form the at least one mounting portion.

5. The UAV of claim 1, wherein the outer structure comprises a receiving portion configured for receiving a circuit module, the receiving portion comprises a bottom wall, each corner of the bottom wall extends along a diagonal direction away from a center of the bottom wall to form at least one arm, the at least one driving module is assembled to the at least one arm, the outer structure further comprises at least one receiving hole surrounding the receiving portion, the at least one arm and the at least one driving modules are received in the at least one receiving hole.

6. The UAV of claim 1, wherein the detecting module is spaced from the outer structure and the detecting module does not contact the outer structure.

7. The UAV of claim 1, wherein the at least one detecting module is a camera module, a focus point of camera module is positioned on a central axis of the cone.

8. The UAV of claim 7, wherein a width of the cone at the peripheral wall is greater than or equate to a width of a field of view of the camera module.

9. An unmanned aerial vehicle (UAV) comprising:
   a housing, the housing comprising:
      an outer structure;
      an inner structure embedded in the outer structure, wherein an elastic coefficient of the outer structure is greater than an elastic coefficient of the inner structure;
   at least one driving module assembled to the housing; and
   at least one detecting module fixed on the inner structure and surrounded by the outer structure, wherein the at least one detecting module is spaced from the outer structure;
   wherein the outer structure comprises a peripheral wall, the peripheral wall comprises at least one receiving chamber, a portion of the inner structure is exposed from the receiving slot to form at least one mounting portion corresponding to the at least one detecting module, the other portion of the inner structure is covered by the outer structure, the at least one detecting module is fixed to the at least one mounting portion.

10. The UAV of claim 9, wherein the at least one detecting module is an ultrasonic detection module, or an infrared detection module.

11. The UAV of claim 9, wherein the inner structure is a ring-shaped plate, the ring-shaped plate is embedded into the outer structure and partially exposed from the receiving slot to form the at least one mounting portion.

12. The UAV of claim 9, wherein the inner structure comprises a plurality of arc-shaped plates, each of the plurality of arc-shaped plates is embedded into the outer structure and partially exposed from the receiving slot to form the at least one mounting portion.

13. The UAV of claim 9, wherein the at least one receiving chamber further comprises two cuts in the peripheral wall, the two cuts are positioned at two sides of the receiving slot.

14. The UAV of claim 13, wherein the peripheral wall comprises two arc surfaces by the two cuts, the arc surfaces extend along a direction toward the receiving slot to form a cone, the at least one detecting module is a camera module, a focus point of camera module is positioned on a central axis of the cone.

15. The UAV of claim 14, wherein a width of the cone at the peripheral wall is greater than or equate to a width of a field of view of the camera module.

* * * * *